US012782717B2

(12) United States Patent
Cui

(10) Patent No.: US 12,782,717 B2
(45) Date of Patent: Nov. 3, 2026

(54) GEOMETRIC TRANSFORMATION BASED OPTICAL SYSTEMS AND METHODS

(71) Applicant: Purdue Research Foundation, West Lafayette, IN (US)

(72) Inventor: Meng Cui, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 818 days.

(21) Appl. No.: 18/099,122

(22) Filed: Jan. 19, 2023

(65) Prior Publication Data

US 2023/0333368 A1 Oct. 19, 2023

Related U.S. Application Data

(60) Provisional application No. 63/300,814, filed on Jan. 19, 2022.

(51) Int. Cl.
*G02B 27/00* (2006.01)
*G02B 3/00* (2006.01)
*G02B 21/00* (2006.01)

(52) U.S. Cl.
CPC ....... *G02B 27/0031* (2013.01); *G02B 3/0087* (2013.01); *G02B 21/0028* (2013.01); *G02B 21/006* (2013.01)

(58) Field of Classification Search
None
See application file for complete search history.

(56) References Cited

U.S. PATENT DOCUMENTS

2013/0150839 A1* 6/2013 Smith ................. A61F 9/00821 606/4
2013/0235383 A1* 9/2013 Boccara ............... A61B 5/0066 356/479

OTHER PUBLICATIONS

Xu, S.,, et al. Behavioral state coding by molecularly defined paraventricular hypothalamic cell type ensembles. Science 370, eabb2494 (2020).
Zhang, L. et al., Unit Title: Miniscope GRIN lens system for calcium imaging of neuronal activity from deep brain structures in behaving animals. Current Protoc Neurosci., 86(1): e56 (2019).
Cox, J. et al., Calcium imaging of sleep-wake related neuronal activity in the dorsal pons. Nature communications 7, 10763 (2016).
Gonzalez, W.G. et al., Persistence of neuronal representations through time and damage in the hippocampus. Science 365, 821-825 (2019).

(Continued)

*Primary Examiner* — Robert E. Tallman
(74) *Attorney, Agent, or Firm* — Purdue Research Foundation

(57) ABSTRACT

An optical system includes first and second optical scanners and first and second gradient-index (GRIN) lenses. The first optical scanner is configured to scan a laser beam in a first scanning path and output a first scanned beam. The first GRIN lens is configured to translate the first scanned beam therethrough. The second optical scanner is configured to scan the first scanned beam in a second scanning path and output as second scanned beam. The second scanning path has a scanning trajectory rotated by 90 degrees relative to the first scanning path. The second GRIN lens is configured to translate the second scanned beam therethrough and collect the emitted signal from the imaging target.

19 Claims, 13 Drawing Sheets

(56) References Cited

OTHER PUBLICATIONS

Aharoni, D. et al., All the light that we can see: a new era in miniaturized microscopy. Nature Methods 16, 11-13 (2019).
De Groot, A. et al., NINscope, a versatile miniscope for multi-region circuit investigations. eLife Tools and Resources 9, e49987, pp. 1-24 (2020).
Lecoq, J. et al., Visualizing mammalian brain area interactions by dual-axis two-photon calcium imaging. Nature Neuroscience 17, 12, 1825-1829 (2014).
Corder, G. et al., An amygdalar neural ensemble that encodes the unpleasantness of pain. Science 363, 276-281 (2019).
Bocarsly, M.E. et al., Minimally invasive microendoscopy system for in vivo functional imaging of deep nuclei in the mouse brain. Biomedical Optics Express 6, 11, 4546-4556 (2015).
Resendez, S.L. et al., Visualization of cortical, subcortical and deep brain neural circuit dynamics during naturalistic mammalian behavior with head-mounted microscopes and chronically implanted lenses. Nature protocols 11, 3, 566-597 (2016).
Murayama M. et al., In vivo dendritic calcium imaging with a fiberoptic periscope system. Nature Protocols 4, 10, 1551-1559 (2009).
Wang, C. et al., Characterization and improvement of three-dimensional imaging performance of GRIN-lens-based two-photon fluorescence endomicroscopes with adaptive optics. Optics Express 21, 27142-27154 (2013).
Qin, Z. et al., Adaptive optics two-photon endomicroscopy enables deep-brain imaging at synaptic resolution over large volumes. Science Advances 6, eabc6521, 1-11 (2020).
Lee, W. et al., Adaptive aberration correction of GRIN lenses for confocal endomicroscopy. Optics Letters 36, 23, 4608-4610 (2011).
Wang, C. et al., Pupil-segmentation-based adaptive optical correction of a high-numerical-aperture gradient refractive index lens for two-photon fluorescence endoscopy. Optics Letters 37, 11, 2001-2003 (2012).
Sun, S. et al., Large-scale femtosecond holography for near simultaneous optogenetic neural modulation. Optics Express 27, 32228-32234 (2019).
Antonini, A. et al., A. Extended field-of-view ultrathin microendoscopes for high-resolution two-photon imaging with minimal invasiveness. eLife Tools and Resources, 9, e58882, 1-35 (2020).

* cited by examiner

GEOMETRIC TRANSFORMATION BASED OPTICAL SYSTEMS AND METHODS

CROSS-REFERENCE TO RELATED APPLICATIONS

This application is related to and claims the priority benefit of U.S. Provisional Application No. 63/300,814, entitled "Geometric Transformation Based Optical Systems and Methods," filed Jan. 19, 2022, the contents of which are hereby incorporated by reference in their entirety into the present disclosure.

GOVERNMENT SUPPORT CLAUSE

This invention was made with government support under EY032382, MH124611, NS107689, NS118302 and NS118330 awarded by the National Institutes of Health. The government has certain rights in the invention.

TECHNICAL FIELD

The present application relates to optical systems and methods, and specifically to geometric transformation based adaptive optical systems using gradient-index lenses that are configured to reduce aberrations in large volume imaging applications.

BACKGROUND

This section introduces aspects that may help facilitate a better understanding of the disclosure. Accordingly, these statements are to be read in this light and are not to be understood as admissions about what is or is not prior art.

Endoscopic fluorescence microscopy has emerged as a powerful tool for the visualization of cellular processes in vivo in internal organs. However, the fabrication of miniature compound objectives for small-diameter endoscopes remains a challenge. An attractive alternative to compound objective lenses is a micro-endoscope having gradient-index (GRIN) lenses, which often take the shape of elongated cylindrical rods. GRIN lenses can therefore be used as compact imaging objective lenses in endoscopes and minimally invasive biological tissue imaging systems. Particularly, GRIN lenses can serve as key components for miniature endoscopes because of their small diameters and ease of assembly. The slim cylindrical lens bodies allowable by using GRIN lenses can permit deeper imaging in biological tissue imaging applications and can do so while causing minimal tissue damage. GRIN endoscopes can offer several advantages, including single-cell resolution, low manufacturing costs, small diameters (e.g., less than 1 mm), long lengths, and relatively high numerical aperture (NA) (e.g., 0.4 to 0.6).

However, the refractive index profile of GRIN lenses can cause inherent, position-dependent spatial aberrations that lower image resolution and sharpness and signal-to-noise ratio. Well-engineered GRIN lens can provide good focus quality at the center of the imaging field of view. However, the outer regions can suffer from strong aberrations. These aberrations can lead to reduced imaging fields of view, low imaging throughput, and poor spatial resolutions.

SUMMARY

Aspects of this disclosure describe a geometric transformation based adaptive optics system (GTAO) utilizing GRIN lenses which can significantly reduce, or in some cases effectively eliminate, position-dependent aberrations. Using aspects of the described GTAO, operators can obtain large-field, high-throughput, high-resolution imaging through GRIN lenses.

Specifically, the present disclosure includes aspects which can include first and second optical scanners and first and second gradient-index (GRIN) lenses. The first optical scanner can be configured to scan a laser beam in a first scanning path (FSP) and output a first scanned beam (FSB). The first GRIN lens can further be configured to pass the first scanned beam (FSB) therethrough. The second optical scanner can be configured to scan the first scanned beam (FSB) in a second scanning path (SSP) and output as second scanned beam (SSB). In some embodiments, the second scanning path (SSP) can have a scanning trajectory rotated by 90 degrees relative to the first scanning path (FSP). Further, the second GRIN lens can be configured to transmit the second scanned beam (SSB) therethrough into the biological tissue and collect the emitted signal from the biological tissue.

Some aspects of the present disclosure include additional features, for example, the first and second GRIN lenses can include identical astigmatism wavefront profiles. In some embodiments, the second GRIN lens can be operable to direct a resultant light signal emitted from the specimen sample through the second GRIN lens in a propagation direction within the second GRIN lens opposite to a propagation direction of the second scanned beam within the second GRIN lens.

In some embodiments, an aberration plate can be positioned in front of the first GRIN lens such that the aberration plate is configured to provide an aberration operable to decrease the focus intensity of the first scanned beam inside the first GRIN lens. In addition, an aberration correction plate can be positioned in front of the second GRIN lens such that the aberration correction plate is configured to undo the aberration provided by the aberration plate prior to the second scanned beam propagating through the second GRIN lens.

Other aspects of the present disclosure include methods for manipulating light beams within an optical system such as for laser scanning. Methods can include propagating an initial light beam through a first GRIN lens and a first scanner to generate a first modified light beam having a desired aberration relative to the initial light beam, rotating a scanning path of the first modified light beam using a second scanner to generate a second modified light beam, and propagating the second modified light beam through a second GRIN lens to cancel the desired aberration and generate a resultant light beam.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1A:
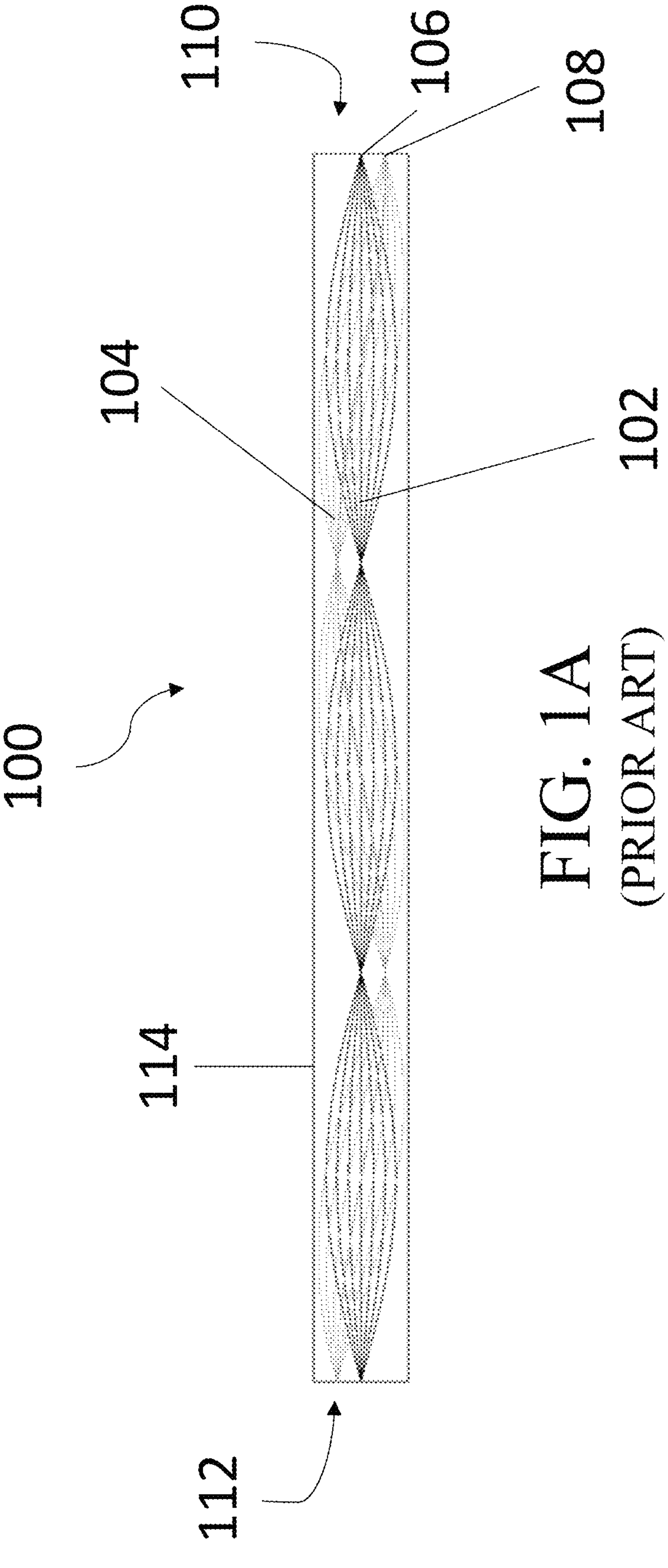
FIG. 1A (PRIOR ART)
FIG. 1A depicts a cross-sectional view of a prior art GRIN lens, showing first and second light paths propagating through the length of the lens.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Figure 1B:
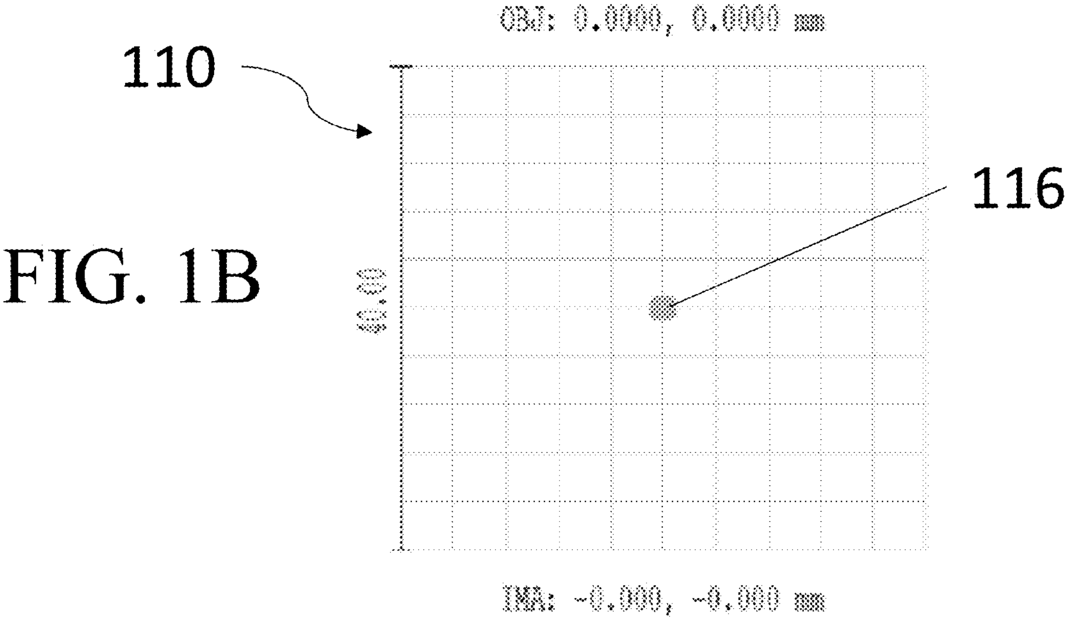
FIG. 1B depicts a graphical representation of a resultant focus profile of the first light path of the GRIN lens of FIG. 1, which is near the center of the field of view.
Figure 1C:
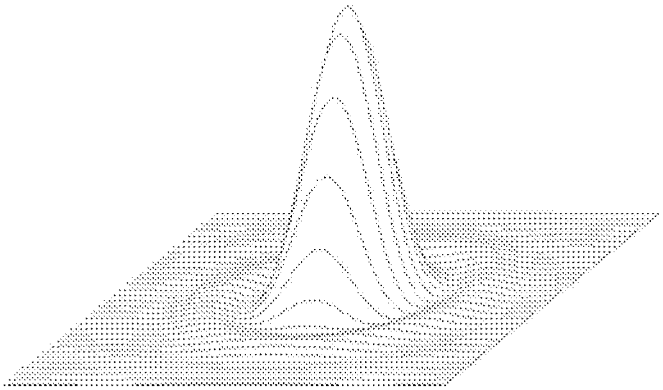
FIG. 1C depicts a graphical representation of a resultant Strehl ratio of the first light path of the GRIN lens of FIG. 1.
Figure 1D:
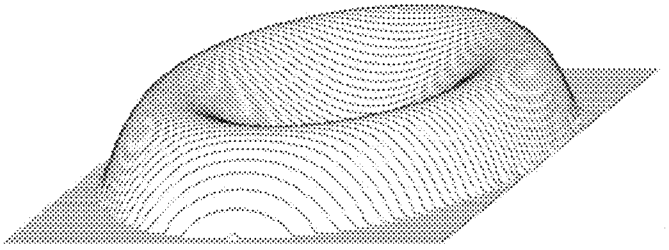
FIG. 1D depicts a graphical representation of a resultant wavefront aberration of the first light path of the GRIN lens of FIG. 1.

Depicted in FIG. 1A is a cross-sectional view of a prior art GRIN lens (100), showing first and second example light paths (102, 104) that are associated with different input light spot locations (106, 108), respectively. The GRIN lens (100) can focus light through its gradient refractive index profile, which can relay optical focus from the input facet (110) to the output facet (112) via the elongate body (114). However, as shown in FIGS. 1B-1G, GRIN lenses commonly contain position-dependent aberrations of the light propagating therethrough. Depicted in FIGS. 1B-1D are the measured light propagation results for the center input spot (106) of the GRIN lens. Particularly, FIG. 1B shows the focus profile (116) of the light propagating through the lens (100) from the center light input spot (116) of the input facet (110). As shown, for the input spot (106) at the center of the GRIN lens, the transmitted spot remains of high quality. Further, as shown in FIG. 1C, the Strehl ratio is satisfactory as it results in a Strehl ratio of approximately 0.99. Finally, as shown in FIG. 1D, the accumulated aberration through the GRIN lens (100) is also very low and satisfactory as it results in a peak to valley of approximately 0.04 lambda.

Figure 1E:
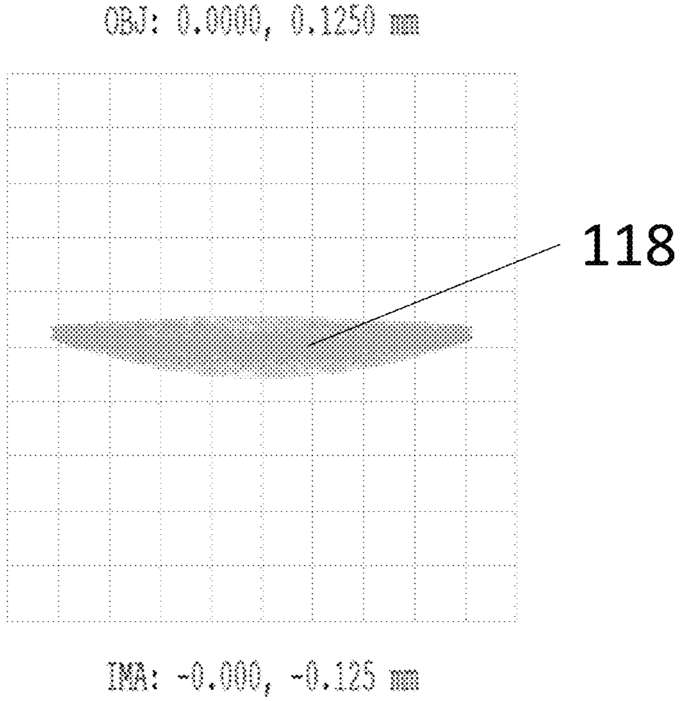
FIG. 1E depicts a graphical representation of a resultant focus profile of the second light path of the GRIN lens of FIG. 1, which is at the outer region of the field-of-view.
Figure 1F:
FIG. 1F depicts a graphical representation of a resultant Strehl ratio of the second light path of the GRIN lens of FIG. 1.
Figure 1G:
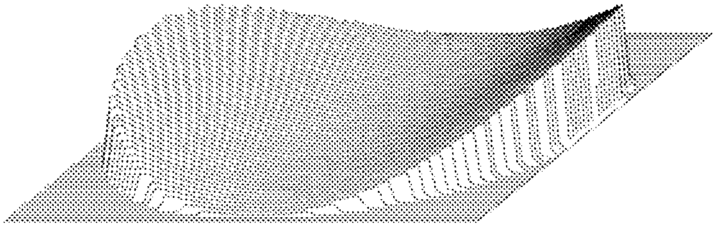
FIG. 1G depicts a graphical representation of a resultant wavefront aberration of the second light path of the GRIN lens of FIG. 1.
Figure 2:
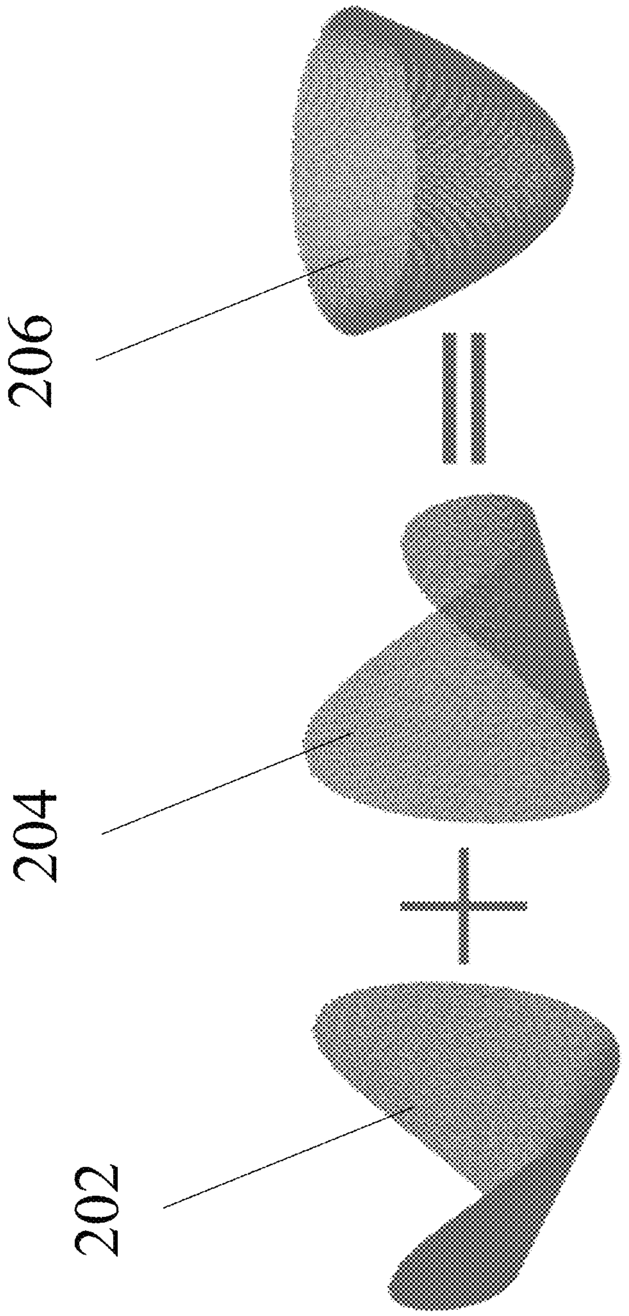
FIG. 2 depicts an example of aberration correction through geometric transformation, showing the combination of two orthogonally-oriented wavefronts of astigmatism of equal strength forming a defocusing wavefront.

Depicted in FIGS. 1E-1G are the measured light propagation results for the outer region of the lens facet (118) of the GRIN lens. Particularly, FIG. 1E shows the focus profile of the light propagating through the lens (100) from the outer region of the lens facet (118) of the input facet (110). As shown, for the input spot (108) at the outer region of the lens facet (118), the transmitted spot from the output facet (112) is severely distorted. Further, as shown in FIG. 1F, the Strehl ratio is unsatisfactory as it results in a Strehl ratio of approximately 0.048. Finally, as shown in FIG. 1G, the accumulated aberration through the GRIN lens (100) is very high and unsatisfactory as it results in a peak to valley of approximately 3.6 lambda.

GRIN lenses can have position-dependent astigmatism (see, for example, FIGS. 1F and 1G), which in effect is similar to adding a cylindrical lens to a collimated laser beam. The net effect is that the laser focus is stretched to a line due to astigmatism (see, for example, FIGS. 1E and 1F). Advantageously, by combining two identical astigmatism wavefront profiles (202, 204) of perpendicular orientations relative to each other (i.e., with one (202) of the astigmatism wavefront profiles being rotated, for example, by 90-degrees relative to the other (204) astigmatism wavefront profile), a spherical lens (206) may be effectively created. In effect, the creation of an effective spherical lens (206) within the two or more GRIN lenses (see, for example, FIG. 3A) will provide effects on the light propagating therethrough which would be similar to combining two cylindrical lenses of perpendicular orientation. Such a spherical wavefront profile (206) results in defocusing of the light propagating therethrough the lens combination, which is no longer aberration. Accordingly, aberration is effectively removed from the imaging system.

Figures 3A, 3B:
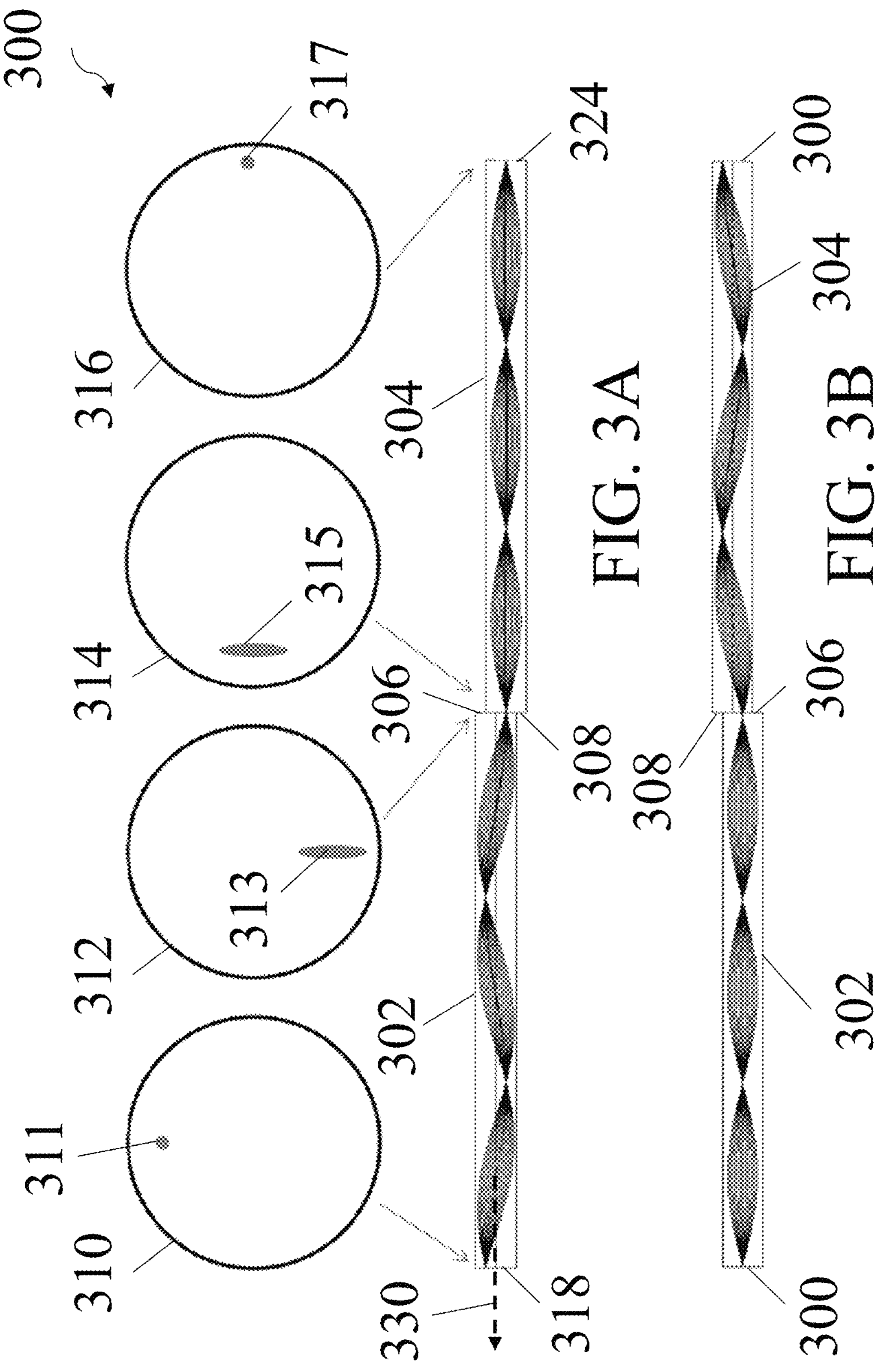
FIG. 3A depicts a side view of one exemplary GTAO, showing two GRIN lenses positioned adjacent to one another at their end facets and light propagating therethrough, and having enlarged portions showing various geometric arrangements of light spots on the end facets of each of the two GRIN lenses.
FIG. 3B depicts a top view of the GTAO of FIG. 3A, showing the light propagating through the two GRIN lenses.

Depicted in FIGS. 3A and 3B is a demonstration of the principle of GTAO (300) having two identical GRIN lenses (302, 304) aligned at their end facets (306, 308). Further, FIG. 3A illustrates enlarged portions (310, 312, 314, 316) showing various geometric arrangements of light spots (311, 313, 315, 317) as would be measured at the end facets (318, 306, 308, 324), respectively, of each of the two GRIN lenses (302, 304). Specifically, the output light signal (e.g., a laser beam) from the first GRIN lens (302) that is being input into the second GRIN lens (304) is rotated 90-degrees (e.g., moving from 6 o'clock to 9 o'clock) with respect to the first GRIN lens (302). More particularly, the rotation is about position change with respect to the axis (330) of the first GRIN lens (302), while the orientation of the beam profile remains unchanged. For example, the laser spot (303) was previously oriented at 6 o'clock at the output facet (306) of the first GRIN lens (302), and then used as the 9 o'clock input spot on the input facet (308) of the second GRIN lens (304). However, the orientation of the beam profile remains the same. For example, both the profiles shown as spots (313, 315) are elongated in the vertical direction. In some embodiments, the light signal may be rotated using galvanometer scanners. Therefore, if the two GRIN lenses (302, 304) are each positioned along an optical path, and a light signal enters the first GRIN lens (302) at facet (318) to encounter an aberration, and the output from facet (306) can be directed into input facet (308) (the light signal as rotated relative to the first GRIN lens (302)) of the second GRIN lens (304). As such, the aberration is directed into the second GRIN lens (304) with the 90-degree position rotation without spinning, so the aberration caused by the second GRIN lens (304) will combine with the existing aberration caused by the first GRIN lens (302) and result in defocusing of the light beam propagating therefore both GRIN lenses (302, 304). Effectively, the described system can reduce or eliminate position-dependent astigmatism by combining the aberration of the first GRIN lens (302) with its geometric transformation (i.e., the 90-degree rotation) of the second GRIN lens (304).

Accordingly, one of two strategies may be utilized to implement a GTAO. In the first strategy, the spot location on the input facet (308) of the second GRIN lens (304) may be kept the same with respect to the output facet (306) of the first GRIN lens (302) while spinning the beam profile by 90 degrees. In the second strategy, the beam profile orientation may be kept the same (i.e., no spinning) on the input facet (308) of the second GRIN lens (304) with respect to the output facet (306) of the first GRIN lens (302), but the location on the input facet (308) of the second GRIN lens (304) may instead be rotated by 90 degrees with respect to the axis (330) of the first GRIN lens (302).

Figure 3C:
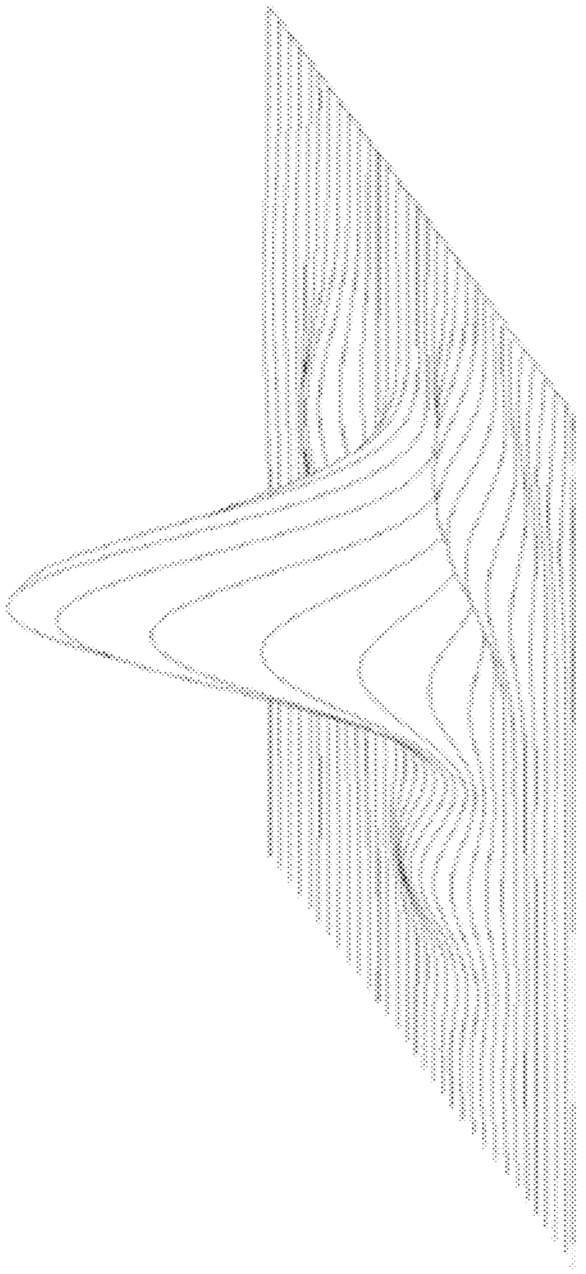
FIG. 3C depicts a graphical representation of a resultant Strehl ratio of the GTAO of FIG. 3A.

The performance of the GTAO of FIG. 3A was evaluated through both simulation and experimental measurement. In the simulation, shown in FIG. 3C, the focus profile was simulated through a 0.5 mm diameter 1.5 pitch GRIN lens at 920 nm. The input to the first GRIN lens (302) is made at the 12 o'clock location of the facet (318), and the output of the first GRIN lens (302) is at the 6 o'clock location. This output is then input into the second GRIN lens (304) at the 9 o'clock location of the facet (308) of the second GRIN lens (304) (i.e., rotated 90-degrees). The output of the second GRIN lens (304) is at the 3 o'clock location. Through such arrangement, the aberration of the first GRIN lens (302) is effectively rotated by 90-degrees before combining it with the aberration of the second GRIN lens (304). Accordingly, the simulation result is illustrated by the Strehl ratio of FIG. 3C, which provides a simulated Strehl ratio of approximately 0.79, shows that near diffraction-limited focus can be achieved by the GTAO described herein.

Figure 4A:
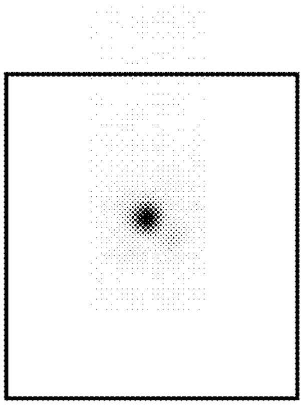
FIG. 4A depicts experimental results of a prior art GRIN lens, showing the measured focus at the center of the 250-micron field of view (FOV)
Figure 4B:
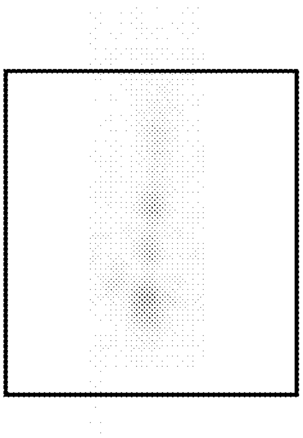
FIG. 4B depicts experimental results of the prior art GRIN lens, showing the measured focus at the edge of the 250-micron FOV.
Figure 4C:
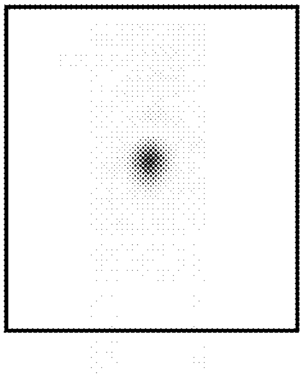
FIG. 4C depicts experimental results of the GTAO of FIG. 3A, showing the measured focus at the edge of the 250-micron FOV.

FIGS. 4A-C depict various experimental results supporting the simulated results described above. In the experiment, two identical 0.5 mm 1.5 pitch GRIN lenses were used. As shown in FIG. 4A, the focus through the first GRIN lens appeared sharp and round at the center of the lens facet. More specifically, at the center of the FOV, the aberration is very low and focus quality is round and of high intensity.

As shown in FIG. 4B, the focus on the spot on the edge of 250-micron FOV (125 microns away from the center of the lens) appears stretched with much-reduced intensity. More specifically, the astigmatism stretched the focus to a line and the focus intensity was greatly reduced.

As shown in FIG. 4C, by applying the second GRIN lens to form the GTAO, a round focus was restored with much-increased focus intensity. With the GTAO, the laser beam experiences two spatially orthogonal astigmatism profiles, which collectively form a defocusing profile (i.e., no longer an aberration). Accordingly, the focus spot is round and of higher intensity relative to the results shown in FIG. 4B.

Figure 5:
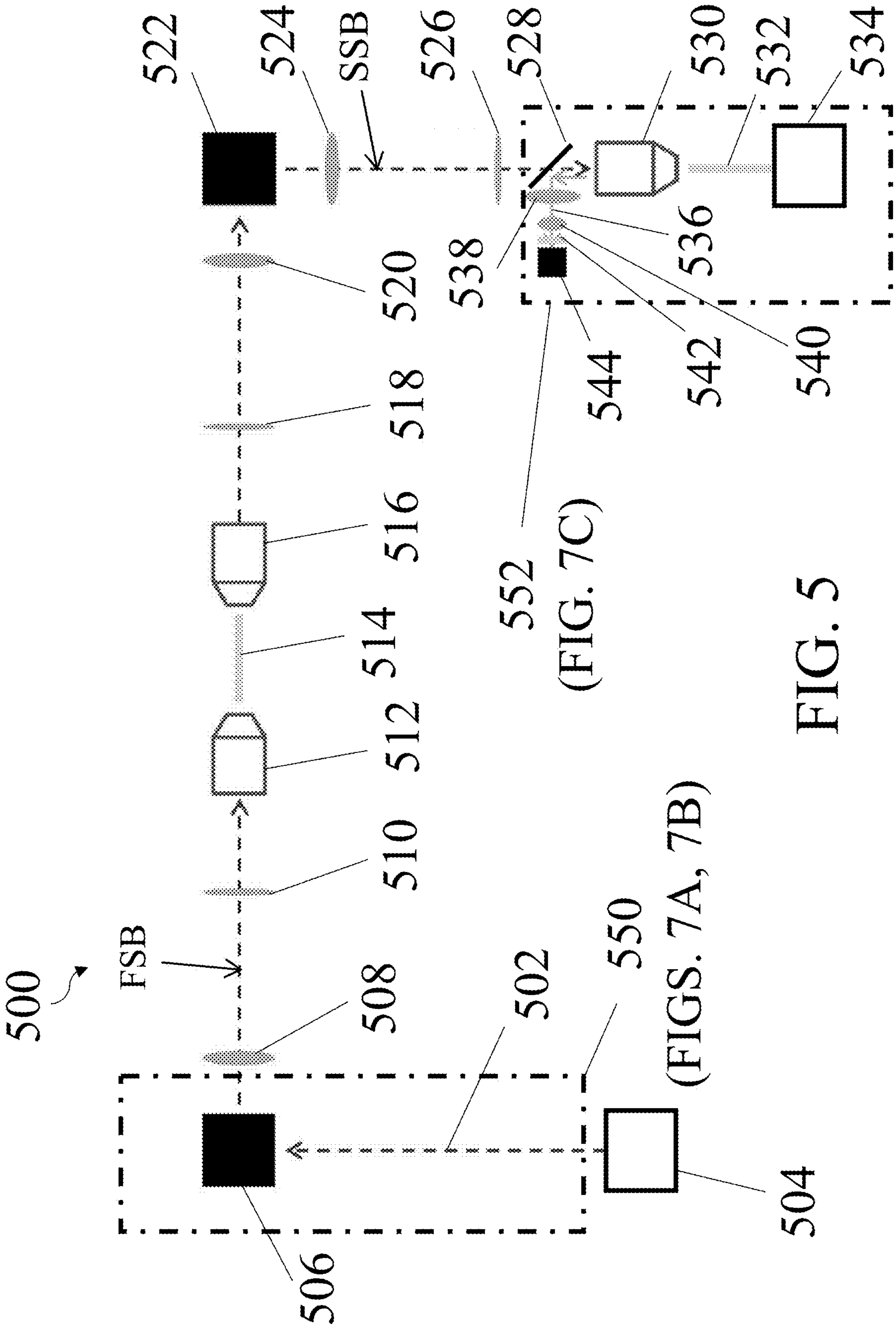
FIG. 5 depicts a schematic of one example of a practical application using a GTAO for laser scanning microscopy.

One application of the GTAO concepts described herein is to achieve high-resolution, large-volume, high-throughput imaging through GRIN lenses. Depicted in FIG. 5 is one example of a GTAO-based optical system (500) for use in a laser scanning microscopy application. While optical system (500) includes various components as will be described herein, it should be understood that practical laser scanning microscopy applications may include other components in addition to or in place of the components described. In the optical system (500), a laser beam (502) is output from a laser source (504) and directed to a first 2-axis laser scanner system (506). The first 2-axis laser scanner system (506) relays the laser beam (502), such as through one or more relay lenses (508, 510), to the pupil of a first objective lens (512) which focuses the laser beam (502) near the end facet of the first GRIN lens (514). The laser beam (502) at the output end facet of the first GRIN lens (514) is collected by a second objective lens (516). The pupil plane of the second objective lens (516) is relayed, such as through one or more relay lenses (518, 520), to a second 2-axis laser scanner system (522). The output laser beam from the second 2-axis laser scanner system (522) is then relayed, such as through one or more relay lenses (524, 526), through a dichroic beam splitter (528) and onto the pupil of a third objective lens (530) which is configured to focus the laser beam (502) onto the input end facet of a second GRIN lens (532). The second GRIN lens (532) is therefore positioned and configured to perform the task of imaging a specimen (534). Accordingly, a specimen image output signal (536) may be directed back through the second GRIN lens (532) and third objective lens (530), separated by the dichroic beam splitter (528), directed optionally through one or more signal collection lenses (538, 540) and an optical filter (542) into a light detector (544) for detection therefrom. In some embodiments, the signal received by the light detector (544) will be converted to electrical signals for processing. As such, the second GRIN lens (532) performs the task of imaging while the first GRIN lens (514) is employed for aberration correction using the GTAO concepts described herein.

Figure 6B:
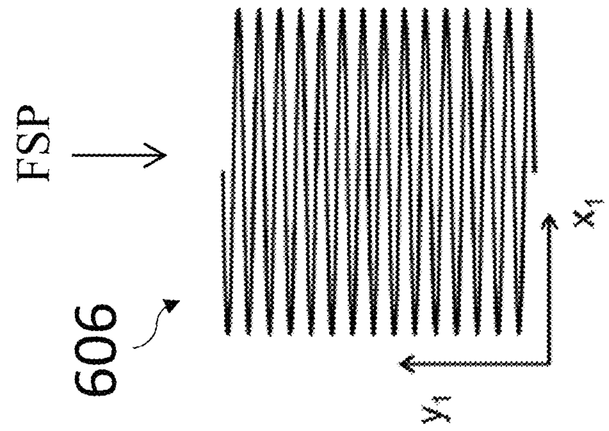
FIG. 6B depicts a graphical representation of the scanning trajectory of the first 2-axis scanner of the practical application of FIG. 5, showing the combined x-axis and y-axis.
Figure 6A:
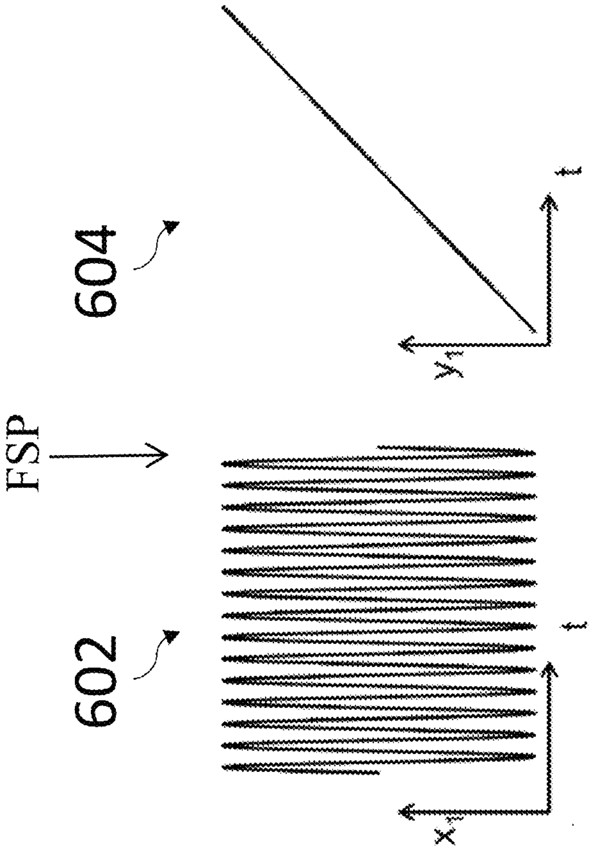
FIG. 6A depicts a graphical representation of the scanning trajectory of a first 2-axis scanner of the practical application of FIG. 5, showing separate x-axis and y-axis data as a function of time.
Figure 6C:
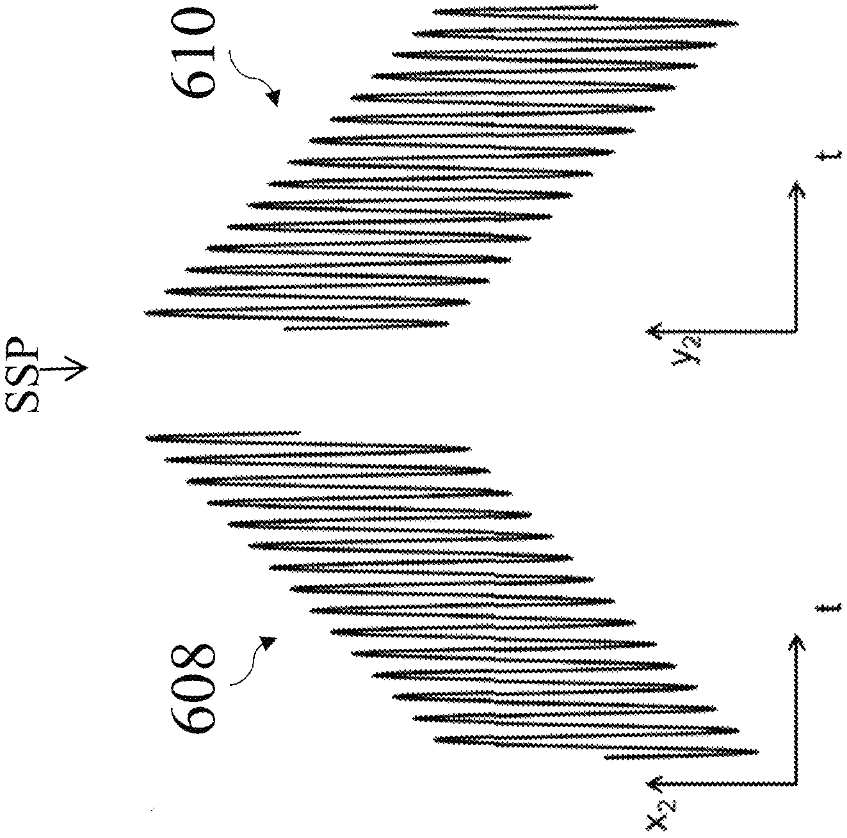
FIG. 6C depicts a graphical representation of the scanning trajectory of a second 2-axis scanner of the practical application of FIG. 5, showing separate x-axis and y-axis data as a function of time.
Figure 6D:
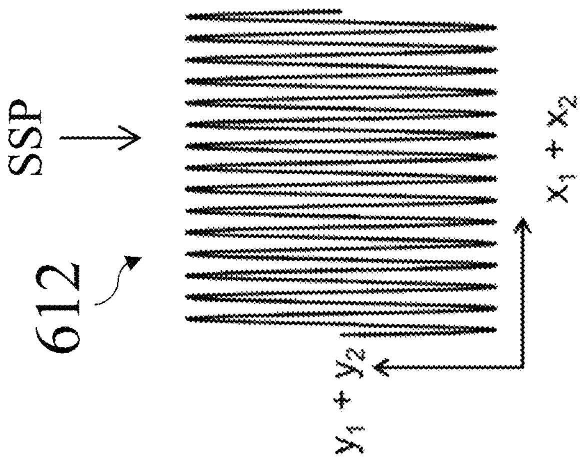
FIG. 6D depicts a graphical representation of the laser scanning trajectory after the second 2-axis scanner of the practical application of FIG. 5, showing the combined result of the two 2-axis scanners.

Depicted in FIGS. 6A-D are the exemplary scanning trajectory of the first and second 2-axis laser scanner systems (506, 522) of the optical system (500) described above. During an imaging procedure, the first 2-axis laser scanner system (506) may be configured to carry out a raster scanning procedure. For example, as depicted in FIG. 6A, the two scanning axes, x-axis and y-axis, may be defined, and Xi may be configured to scan in a sinusoidal pattern (602) and Yi may be configured to scan in a sawtooth pattern (604). Accordingly, shown in FIG. 6B is the combined 2-dimensional scanning pattern (606) projected onto the first GRIN lens (514) using raster scanning. To implement the GTAO, the second 2-axis laser scanner system (522) may be configured to perform a 90-degree (positive or negative) position rotation of the scanning pattern (606). For example, if the first 2-axis laser scanner system's (506) x- and y-scanning paths are defined as a and b, respectively, the second 2-axis laser scanner system's (522) x- and y-scanning path may be manipulated and defined as (−a+b) (608) and (−a−b) (610). As such, the combined effect (612) for the scanning path of the second GRIN lens (532) will become b and −a, respectively, which is a −90-degree rotation with respect to the scanning pattern of the first GRIN lens (514).

Figure 7A:
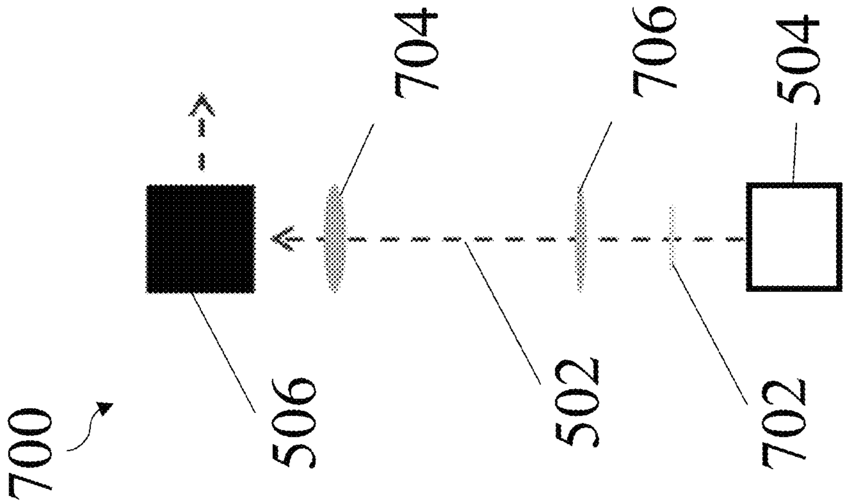
FIG. 7A depicts a schematic of an alternative example of the practical application of FIG. 5, including a transmissive aberration plate and transmissive correction plate.
Figure 7B:
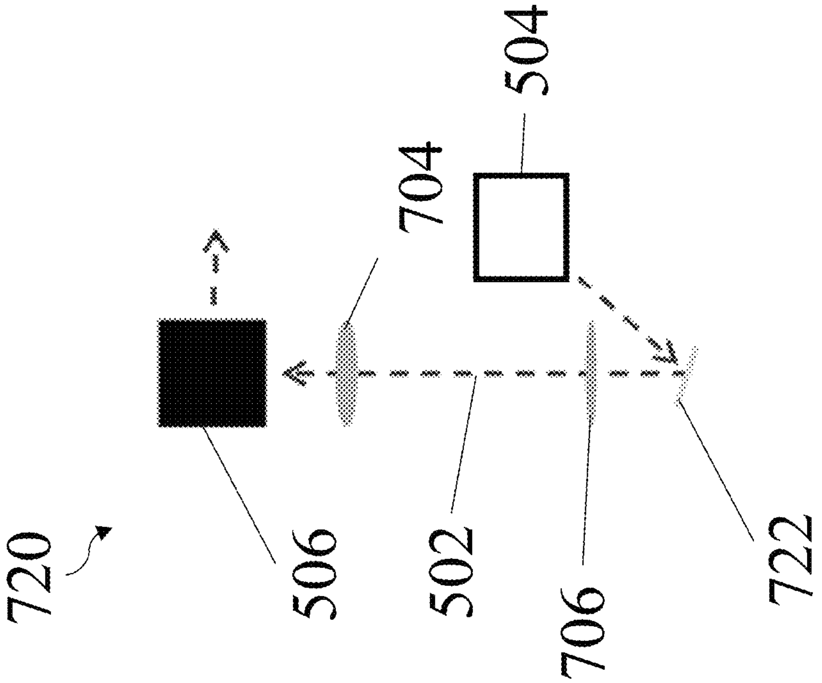
FIG. 7B depicts a schematic of another alternative example of the practical application of FIG. 5, including a reflective aberration plate and transmissive correction plate.
Figure 7C:
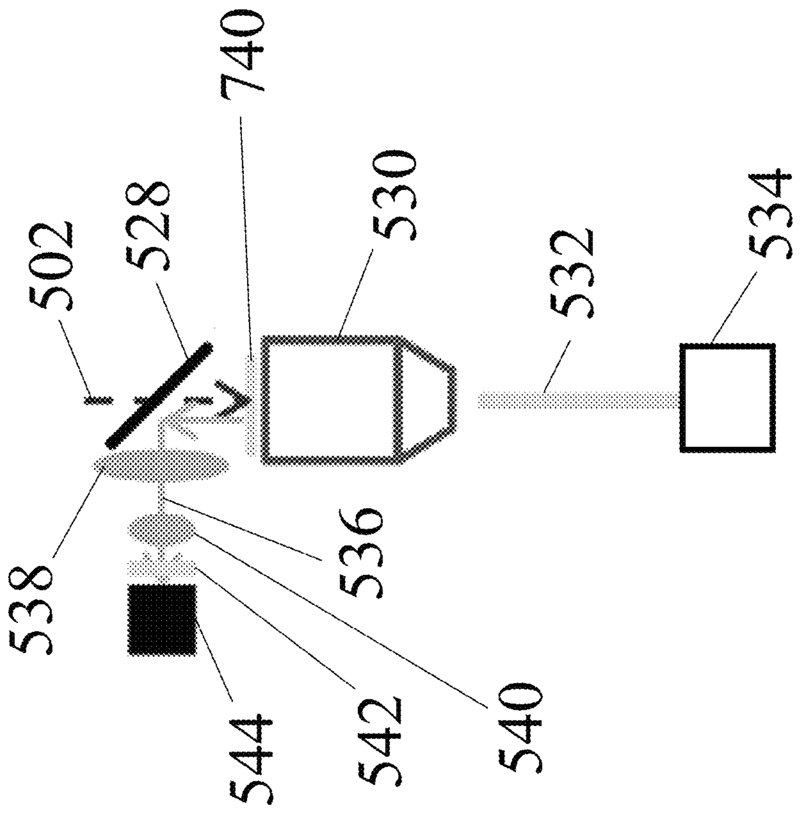
FIG. 7C depicts a schematic of an example of aspects which may be included with the practical applications of FIG. 7A and FIG. 7B, including an aberration correction plate.

FIGS. 7A and 7B show alternative optional features which may be included in the optical system (500) for imaging applications that require high laser power. In such cases, it is important to ensure that the laser intensity inside the first GRIN lens (514) is less than the damage threshold of the first GRIN lens (514). Specifically, FIG. 7A shows a first exemplary solution (700) to increase the power handling capability of the first GRIN lens (514). Referencing portion (550) of the optical system (500), a transmissive aberration plate (702) may be added to the laser light path at any point before the light (502) enters the first GRIN lens (514). For example, the aberration plate (702) may be positioned anywhere before the first 2-axis laser scanner system (506) and may include one or more relay lenses (704, 706) to relay the output from the aberration plate (702) to the first 2-axis laser scanner system (506). Alternatively, as shown in the solution (720) of FIG. 7B, the aberration plate (722) may instead be reflective rather than transmissive.

In either solution (700, 720), the focus inside the first GRIN lens (514) may be distorted and the focus intensity reduced to permit more power to be delivered through the first GRIN lens (514) without causing optical damage to the first GRIN lens (514). To correct the added aberration from the aberration plate (702 or 722), a transmissive aberration correction plate (740) may be included. Referencing portion (552) of the optical system (500), aberration correction plate (740) may be positioned anywhere after the second 2-axis laser scanner system (522), such as near the pupil of the third objective lens (530).

Figure 8:
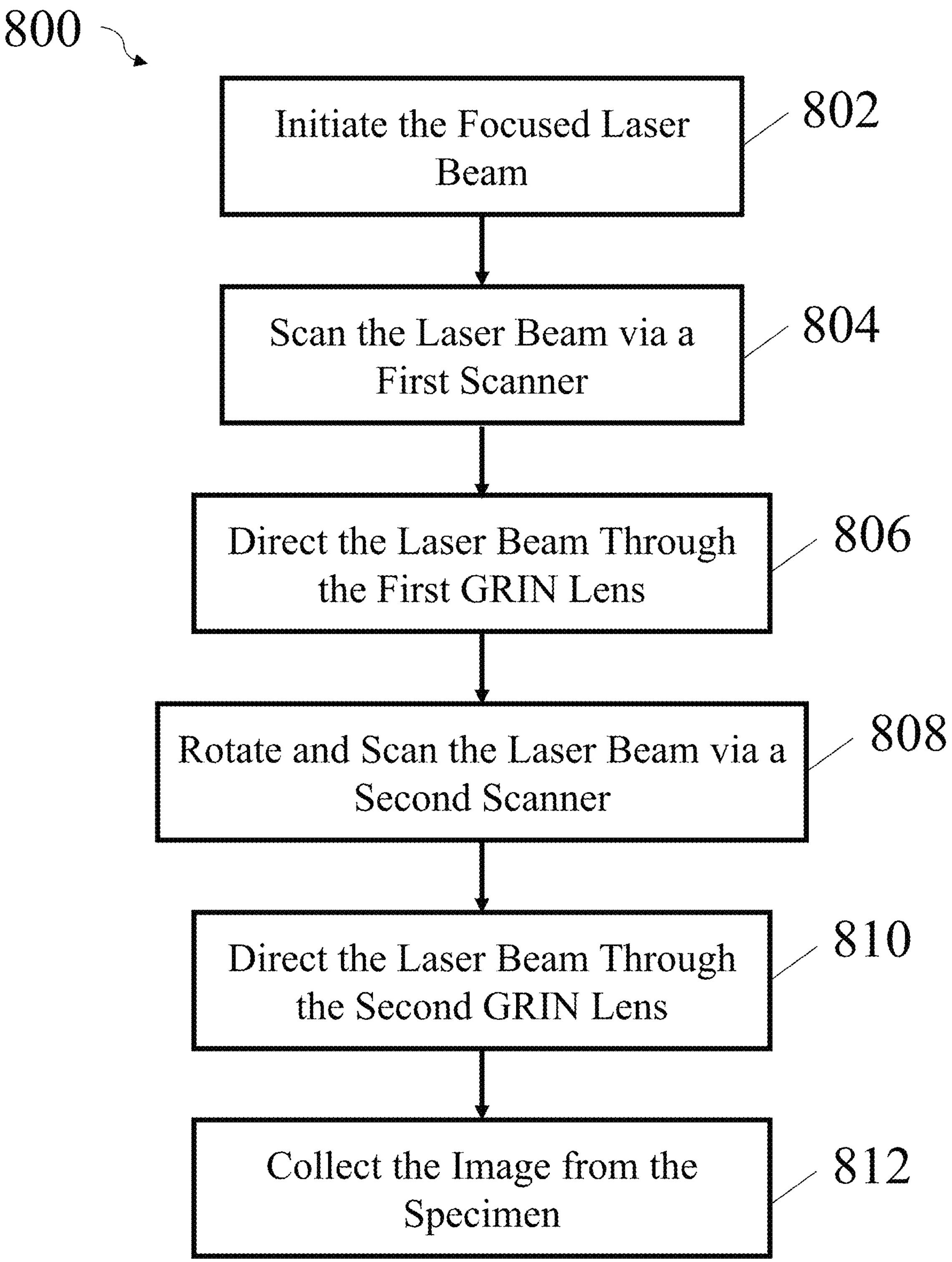
FIG. 8 depicts a flowchart of one exemplary method of imaging a specimen using a GTAO.

FIG. 8 shows a flowchart of on exemplary method (800) of imaging a specimen using a GTAO. At step (802), the focused laser beam may be initiated, such as by using a laser source commonly utilized in imaging applications. At step (804), a first scanner, such as a 2-axis scanner or similar, is utilized to scan the focused beam. In order to generate a digital image from an extended specimen in laser scanning microscopy, the focused beam is often scanned laterally (in the x-y plane) across the specimen surface in a rectangular raster pattern to form a first scanning trajectory. At step (806), the focused beam is focused onto a facet of a first GRIN lens. Thereafter, at step (808), the output beam from the first GRIN lens is focused to a second scanner. For example, the second scanner may be a 2-axis scanner or other device similarly configured for microscopy applications. The second scanner may be configured to rotate the focused laser beam, such as by approximately 90-degrees in either rotational direction relative to the initial focused laser beam output from the first GRIN lens to form a second scanning trajectory. At step (810), the output focused laser beam from the second scanner is focused to the second GRIN lens for collection of an image from a specimen at step (812). The laser excited optical signal is collected by a detector and recorded by data acquisition systems for further processing and storage.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element, or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

I claim:

1. An optical system, comprising:

(a) a first optical scanner configured to scan a laser beam in a first scanning path and output a first scanned beam;

(b) a first gradient-index (GRIN) lens configured to translate the first scanned beam therethrough;

(c) a second optical scanner configured to scan the first scanned beam in a second scanning path and output as second scanned beam, wherein the second scanning path is defined having scanning trajectory rotated by 90 degrees relative to the first scanning path; and (d) a second GRIN lens configured to translate the second scanned beam therethrough and (d) emit a light signal therefrom, wherein the second GRIN lens is configured to focus the emitted light signal onto a specimen sample.

2. The optical system of claim 1, wherein the first and second GRIN lenses include similar astigmatism wavefront profiles.

3. The optical system of claim 1, wherein the second GRIN lens is operable to direct a resultant light signal emitted from the specimen sample therethrough the second GRIN lens in a propagation direction within the second GRIN lens opposite to a propagation direction of the second scanned beam within the second GRIN lens.

4. The optical system of claim 3, further comprising a dichroic beam splitter operable to direct the resultant light signal toward a light detector.

5. The optical system of claim 4, further comprising:

(a) an aberration plate positioned in front of the first GRIN lens such that the aberration plate is configured provide an aberration operable to decrease the focus intensity of the first scanned beam prior to the first scanned beam propagating through the first GRIN lens; and (b) an aberration correction plate positioned in front of the second GRIN lens such that the aberration correction plate is configured to undo the aberration provided by the aberration plate prior to the second scanned beam propagating through the second GRIN lens.

6. The optical system of claim 5, wherein the aberration correction plate is configured to increase the focus intensity of the second scanned beam prior to the second scanned beam propagating through the second GRIN lens.

7. The optical system of claim 5, wherein the aberration plate is reflective of light.

8. The optical system of claim 5, wherein the aberration plate is transmissive of light.

9. A method of manipulating a light beam within an optical system, comprising:

(a) propagating an initial light beam through a first gradient-index (GRIN) lens and a first scanner to generate a first modified light beam having a desired aberration relative to the initial light beam;

(b) rotating a scanning path of the first modified light beam using a second scanner to generate a second modified light beam; and (c) propagating the second modified light beam through a second GRIN lens to cancel the desired aberration and generate a resultant light beam.

10. The method of claim 9, wherein the resultant light beam forms a defocusing waveform profile relative to the initial light beam.

11. The method of claim 9, further comprising:

(a) by propagating the initial light beam through the first GRIN lens, subjecting the initial light beam to a first aberration profile; and (b) by propagating the second modified light beam through the second GRIN lens, subjecting the second modified light beam to a second aberration profile, wherein the first and second aberration profiles are orthogonal relative to each other.

12. The method of claim 9, wherein the scanning path of the first modified light beam is rotated by 90 degrees via the second scanner.

13. The method of claim 9, further comprising:

(a) decreasing the focus intensity of the initial light beam using an aberration plate prior to the initial light beam propagating through the first GRIN lens; and (b) increasing the focus intensity of the second modified light beam using an aberration correction plate prior to the second modified light beam propagating through the second GRIN lens.

14. The optical system of claim 9, wherein the second GRIN lens is operable to output a second resultant light beam onto a specimen.

15. A method of imaging a specimen, comprising:

(a) initiating a focused light beam;

(b) scanning the focused light beam to form a first scanned light trajectory;

(c) transmitting the first scanned light trajectory through a first gradient-index (GRIN) lens;

(d) after transmitting the first scanned light trajectory through the first GRIN lens, rotating a scanning trajectory of the first scanned light trajectory by 90 degrees to generate a second scanned light trajectory; and (e) transmitting the second scanned light trajectory through a second GRIN lens; and (f) after transmitting the second scanned light trajectory through the second GRIN lens, directing the second scanned light trajectory toward the specimen.

16. The method of claim 15, wherein the first and second GRIN lenses include similar wavefront profiles.

17. The method of claim 15, further comprising: transmitting emitted light signals from the specimen through the second GRIN lens.

18. The method of claim 15, further comprising:

prior to translating the focused light beam through the first GRIN lens, decreasing the focus intensity of the focused light beam using an aberration plate.

19. The method of claim 18, further comprising:

prior to translating the second scanned light trajectory through the second GRIN lens, increasing the focus intensity of the second scanned light trajectory using an aberration correction plate.

* * * * *